United States Patent

[11] 3,596,145

| [72] | Inventors | Edward J. Sheldon<br>Lexington;<br>Rosario Mangiapane, Burlington; Edwin Segarra, Farmington, all of, Mass. |
|---|---|---|
| [21] | Appl No. | 862,553 |
| [22] | Filed | July 8, 1969<br>Division of Ser. No. 726,352, May 3, 1968, Pat. No. 3,484,785 |
| [45] | Patented | July 27, 1971 |
| [73] | Assignee | Raytheon Company<br>Lexington, Mass. |

[54] DRIVE CIRCUIT FOR FERRITE PHASE SHIFTERS
9 Claims, 11 Drawing Figs.

[52] U.S. Cl. ................................................. 317/123,
343/100 SA, 343/854, 317/148.5 R
[51] Int. Cl. ....................................................... H01h 47/22
[50] Field of Search............................................. 317/123;
343/859, 100.6, 778

[56] References Cited
UNITED STATES PATENTS

| 2,992,409 | 7/1961 | Lawrence | 317/135 |
|---|---|---|---|
| 3,154,784 | 10/1964 | Allen | 343/778 X |
| 3,293,495 | 12/1966 | Smith | 317/123 X |
| 3,345,631 | 10/1967 | Chamberlin | 343/854 X |

*Primary Examiner*—J. D. Miller
*Assistant Examiner*—Harry E. Moose, Jr.
*Attorneys*—Philip J. McFarland and Joseph D. Pannone ABSTRACT: A beam-steering apparatus in combination with a phased array antenna. The apparatus comprises a source of reference pulses of frequency ($1/T_0$). Also included are means responsive to beam-steering angle magnitude signals $\Phi$ for generating proportional pulse width modulated pulses such that each pulse width $T=\Phi T_0/2\pi$. Additional means responsive to the modulated pulses alter the phase of the corresponding phase shift device in the phased array element with output pulses of width T when $\frac{T}{T_0} \leq 1$, and $T-T_0$ when $\frac{T}{T_0} > 1$.

BEAM STEERING APPARATUS

INVENTORS
EDWARD J. SHELDON
ROSARIO MANGIAPANE
EDWIN SEGARRA

FIG. 2a TIME REFERENCES 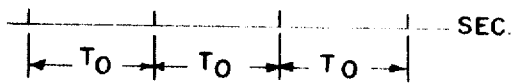

FIG. 2b ROW BEAM ANGLE SIGNALS 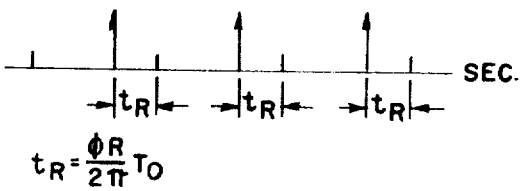

$$t_R = \frac{\phi_R}{2\pi} T_0$$

FIG. 2c COLUMN BEAM ANGLE SIGNALS 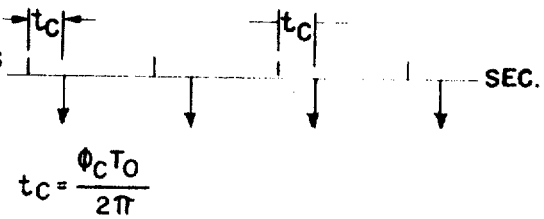

$$t_C = \frac{\phi_C T_0}{2\pi}$$

FIG. 2d SUM OF ROW & COLUMN BEAM ANGLE SIGNALS 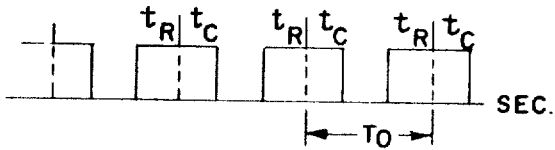

$$d = \frac{t_R + t_C}{T_0} = \frac{\phi_R + \phi_C}{2\pi} \qquad d \leq 1$$

FIG. 2e SUM OF ROW AND COLUMN BEAM ANGLE SIGNALS EXCEEDING $2\pi$ 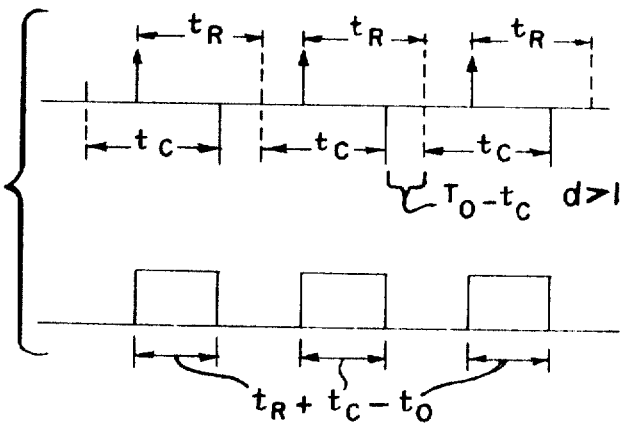

$$d = \frac{t_R + t_C - t_0}{T_0} = \frac{\phi_R + \phi_C - 2\pi}{2\pi}$$

INVENTORS
EDWARD J. SHELDON
ROSARIO MANGIAPANE
EDWIN SEGARRA

PHASE SHIFT DRIVER $D_{ij}$

PHASE SHIFT DRIVER WITH EXTERNAL CONTROL NETWORK

COIL AND SHORTED TURN

EQUIVALENT CIRCUIT OF THE COIL

COIL DISCHARGE WITH SHORTED TURN

INVENTORS
EDWARD J. SHELDON
ROSARIO MANGIAPANE
EDWIN SEGARRA 3,596,145

DRIVE CIRCUIT FOR FERRITE PHASE SHIFTERS

This application is a division of copending application, Ser. No. 726,352, now U.S. Pat. No. 3,484,785 filed May 3, 1968.

BACKGROUND OF THE INVENTION

This invention relates to a beam-steering apparatus in combination with a phased array antenna, and more particularly, to current drivers in combination with ferrite phase shifters in such phased array antennas.

In electronically steered phased array antennas, a plurality of individual antenna radiating elements are arranged in linear or matrix array to provide beam steering by electronic techniques. Beam steering is accomplished by altering the phase relation of signals on different radiating elements. This is instrumented by changing the corresponding phase of the phase shift device in the phased array element. The phase shift devices have used a ferrite rod located within a waveguide section, in turn, surrounded by a coil. Such a system is, for example, shown in an article entitled, "Polarization Insensitivity Phase Shifter for Use in Phased Array Antennas," by Mohr and Monaghan, published in the 1967 G-MTT Symposium Digest, May 28, 1967, pages 91—94. Significantly, such devices are current responsive and require current drivers.

In matrix array, the phase shifters may alter phase by the summing of row and column beam-steering angle magnitude signals. These signals independently vary from 0° to 360° such that their sum will cover a region of approximately 720°. It is desirable to avoid driving the phase shifter greater than 360° in view of the fact that the required maximum corresponding phase shifter physical length is increased for linear operation. A signal propagated through additional distance is subject to additional loss. There is thus a need for a decision-making device at the phase shifter for determining when a selected sum exceeds 360° and deriving a signal indicative of only the excess phase over 360°. Angles may be described and measured in terms of degrees i.e. 0° to 360° or by corresponding radian measure i.e. O to $2\pi$ radians.

In the prior art, coil arrangements surrounding the ferrite phase shifter were used to buck the flux to accomplish the modulo $2\pi$ subtraction. Finally, digital adders have also been used in such matrix arrays. This is set forth in FIG. 7 of U.S. Pat. No. 3,274,601 issued on Sept. 20, 1966 to J. Blass.

It is accordingly an object of this invention to devise a beam-steering apparatus which can effect a modulo $2\pi$ phase shift using simplified analog circuit structure.

It is another object of this invention to devise a beam-steering apparatus used with phased array antennas. These typically include a matrix having cross-point phase shift elements that sum corresponding row and column beam-steering angle magnitude signals, modulo $2\pi$ the sum to obtain an angle in the range between 0° and 360° and provide an output signal for phase shift purposes proportional to the sum modulo $2\pi$.

It is yet a related object of the invention to devise a modulo $2\pi$ angle indicating apparatus in analog circuit configuration.

SUMMARY OF THE INVENTION

The objects of this invention are satisfied in a preferred embodiment in which a beam-steering apparatus is used in combination with a phased array matrix antenna. The apparatus comprises a source of reference signals of frequency ($1/T_0$). Also included are means responsive to first beam-steering angle magnitude signals $\Phi_R$ for applying corresponding first signals to the matrix rows. Each first signal is proportionally spaced in time by an interval $t_R=(\Phi_R T_0/2\pi)$ prior to a given reference signal. Likewise, means responsive to second beam-steering angle magnitude signals $\Phi_C$ apply corresponding second signals to the matrix columns. Each second signal is proportionally spaced in time by an interval $t_C=(\Phi_C T_0/2\pi)$ after the given reference signal. Lastly, means at each matrix cross-point responsive to the reference signals, first signals and second signals defining a time interval $t_C+t_R$ alter the phase shift of the corresponding matrix antenna element. This is controlled by having the output signals proportional to $\Phi_R+\Phi_C$ when $\frac{t_R+t_C}{T_0}\leq 1$ and proportional to $\Phi_C+\Phi_R-2\pi n$ when $t_R+t_C > 1$, $n$ being any integer and $|\phi_C+\phi_R-2\pi n|<2\pi$.

There is in effect a pulse width modulation of each reference pulse proportional to the sum of the angles. The modulo $2\pi$ of the sum is achieved by comparing the modulated pulse width to the period of the reference pulse. If the ratio is greater than 1; then an output pulse of width $T-T_0$ is used to alter the corresponding antenna element phase shift. Significantly, the object of devising a modulo $2\pi$ angle indicating apparatus is likewise satisfied and furthermore is operable even though the frequency of the reference signal is changed. This last aspect arises from relating the pulse width T to $T_0$ by the factor ($\Phi 2\pi$).

A specific preferred circuit embodiment of the invention shows a driver in combination with a ferrite phase shifter. Since the ferrite phase shifter is a current responsive device, then the driver comprises a current source and means responsive to a pulse train or interconnecting the source to the phase shifter only for the duration of each pulse. This is instrumented by forming the current source from a voltage source in series with coil. A first current path, including the coil and the voltage source, is established only during the pulse duration and a second current path, including the coil, is established during the interpulse interval to maintain the current magnitude in the coil either constant or changeable under control.

BRIEF DESCRIPTION OF THE DRAWINGS

FIGS. 2a—e show timing diagrams of the pulse width modulation of the reference pulses particularly emphasizing the aspect of the modulated pulse width exceeding the period of the reference pulses;

DESCRIPTION OF THE PREFERRED EMBODIMENT

Figure 1:
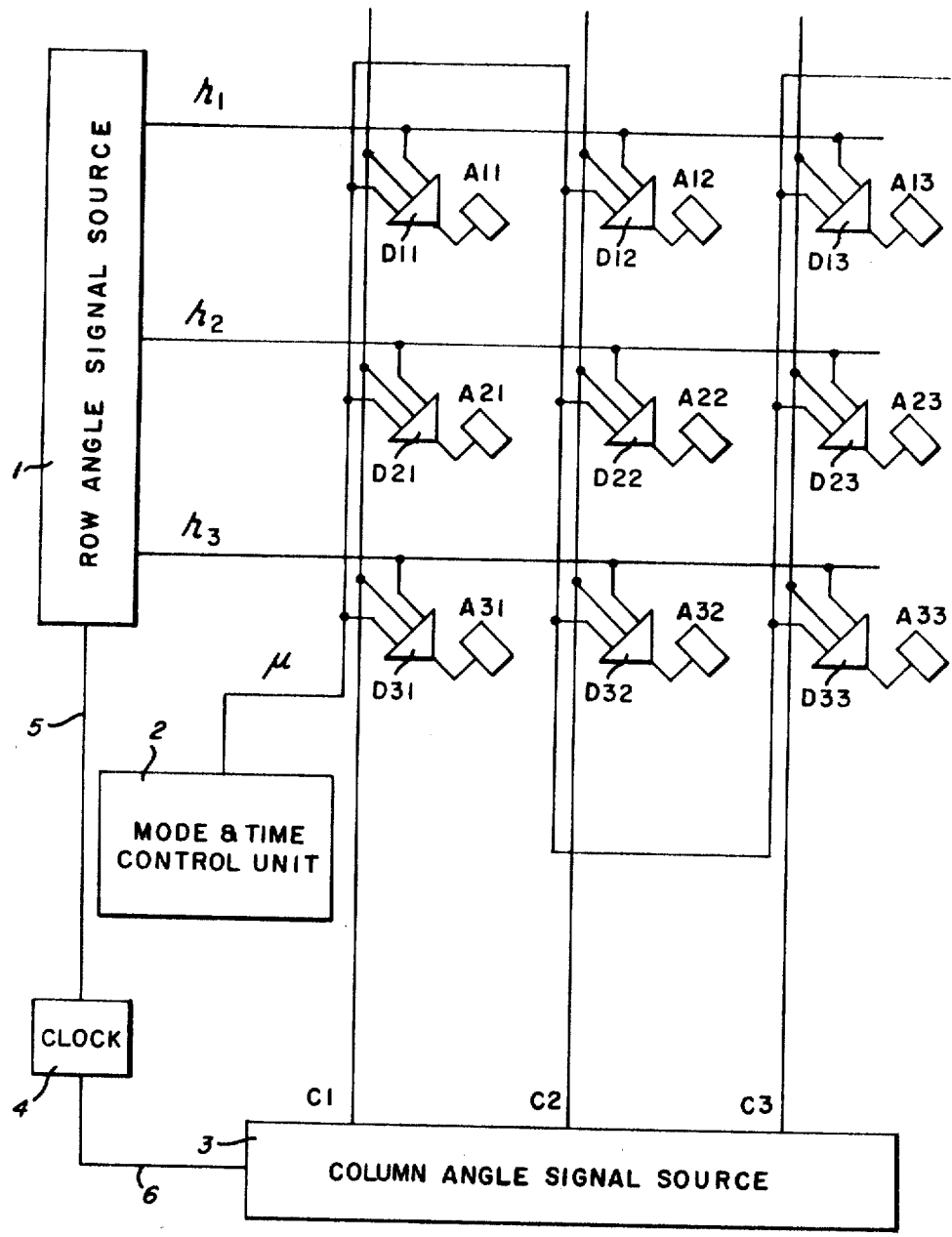
FIG. 1 is a block diagram of the beam-steering apparatus used in combination with a phased matrix array antenna.

FIG. 1 exhibits a beam-steering apparatus in block diagram form in combination with a phased matrix array antenna. A plurality of radiating elements and corresponding phase shifters coupled to them are shown as elements $A_{11}-A_{33}$ in matrix array. A plurality of phase shift drivers $D_{11}-D_{33}$ intercouple the antenna elements to a corresponding electrical conductor matrix formed by row conductors $r_1$, $r_2$, and $r_3$ and column conductors $c_1$, $c_2$, and $c_3$. The drivers may be considered as the appropriate cross-point elements for the matrix. Each of the matrix row conductors connects a row phase shift angle signal source to a corresponding terminal input on a given driver row. Thus, row conductor $r_1$ couples drivers $D_{11}$, $D_{12}$, and $D_{13}$. Thus, row conductor $r_3$ couples drivers $D_{31}$, $D_{32}$, and $D_{33}$.

A column phase shift angle signal source 3 couples a second input to corresponding column terminals of the drivers over column conductors $c_1$, $c_2$, and $c_3$. Illustratively, column conductor $c_2$ connects drivers $D_{22}$, $D_{23}$, and $D_{12}$. A mode and time control unit 2 is coupled by conductor $u$. This unit permits the phase shift driver to operate in several modes such as charging, steady state, and dumping.

Also shown is clock 4 which operates as the course of reference signals having a frequency of ($1/T_0$). This clock is coupled to the row angle signal source 1 and the column angle signal source 3 over paths 5 and 6 respectively.

Attention is now directed to FIGS. 2a—e to be considered along with the embodiment illustrated in FIG. 1.

The timing references shown in FIG. 2a having a frequency of ($1/T_0$) are simultaneously applied by the clock to the angle signal sources 1 and 3. The angle signal sources each generate simultaneously or otherwise pulse signals on corresponding row or column conductors. Thus, for the row angle signal source 1 pulse signals are applied to row conductors $r_1$, $r_2$, and $r_3$. The signals are applied at a point in time prior to the occurrence of a given reference pulse. This time interval $t_R$ is proportional to the phase shift angle magnitude signal $\Phi_R$. In this invention, the interval $t_R$ is set equal to ($\Phi_R T_0/2\pi$). In normal operation, $\Phi_R$ and $\Phi_C$ will vary between 0 and $2\pi$. However, the magnitude of $\Phi_R$, or for that matter $\Phi_C$, may in steady state have any value. Thus, if $\Phi_R$ was equal to $3\pi$ radians, then $t_R$ would be equal to ($3T_0/2$). It is emphasized again that the interval $t_R$ may represent different values as applied to each row conductor.

Column phase shift angle signal source 3 impresses corresponding signals shown in FIG. 2c spaced in time after the reference pulse upon corresponding column conductors $c_1$, $c_2$, and $c_3$. The time interval $t_C$ is proportional to a corresponding phase shift angle signal magnitude of $\Phi_C$. The interval is set equal to ($\Phi_C T_0/2\pi$). This interval may be of different magnitude upon each conductor. Each of the time intervals determined by the row and column signals is combined at a corresponding cross-point device. Thus, an interval $t_R$ impressed on row conductor $r_2$ and an interval $t_C$ impressed on column conductor $c_3$ would be summed as is shown in FIG. 2d at cross-point driver $D_{23}$ in FIG. 1.

In FIG. 2e the sum of the intervals as represented by the row and column phase shift angle signals which exceed $2\pi$ is set forth. This illustrates the modulo $2\pi$ effect. It should be noted that the resulting signal is the sum $t_R+t_C-T_0$.

Figure 3A:
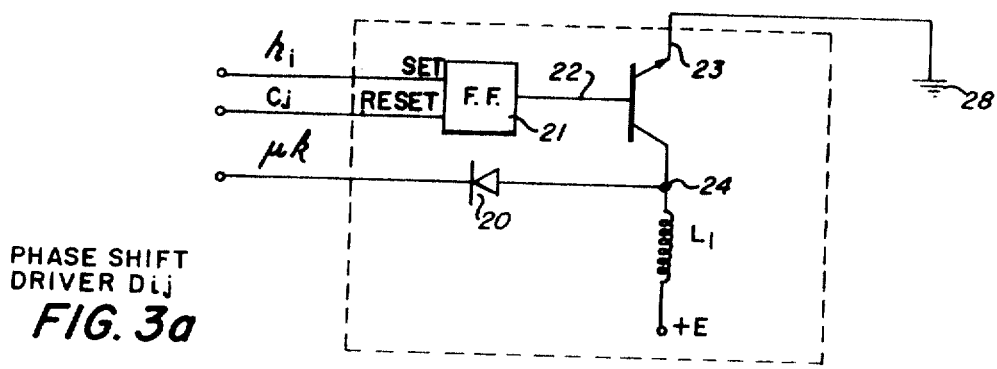
FIG. 3A shows a block diagram of the phase shift driver constituting a portion of the cross-point elements $D_{11}-D_{33}$ in the matrix shown in FIG. 1.

FIG. 3a shows a general embodiment of the phase shift driver according to the invention. In FIG. 1, the antenna and shift element is represented symbolically by $A_{ij}$. The coil $L_1$ in FIG. 3a represents a portion of the input to the phase shifter. Coil $L_1$ is driven by transistor $T_1$ and is coupled to the collector electrode. The transistor emitter electrode is terminated at ground 28 through conductor 23. Flip-flop 21 drives the transistor base over conductor 22. The flip-flop SET input is coupled to the $i$th row conductor. The RESET flip-flop input is coupled to the $j$th column conductor.

Operationally, the row signal sets flip-flop 21 which drives transistor $T_1$ into saturation. This electrically couples the coil $L_1$ to the transistor. The signal upon the corresponding column activates the RESET input which turns the transistor off. AFter the transistor is turned off, the current path including diode 20 can be used to discharge the coil current or recirculate it through the coil and an appropriate voltage source.

Figure 3B:
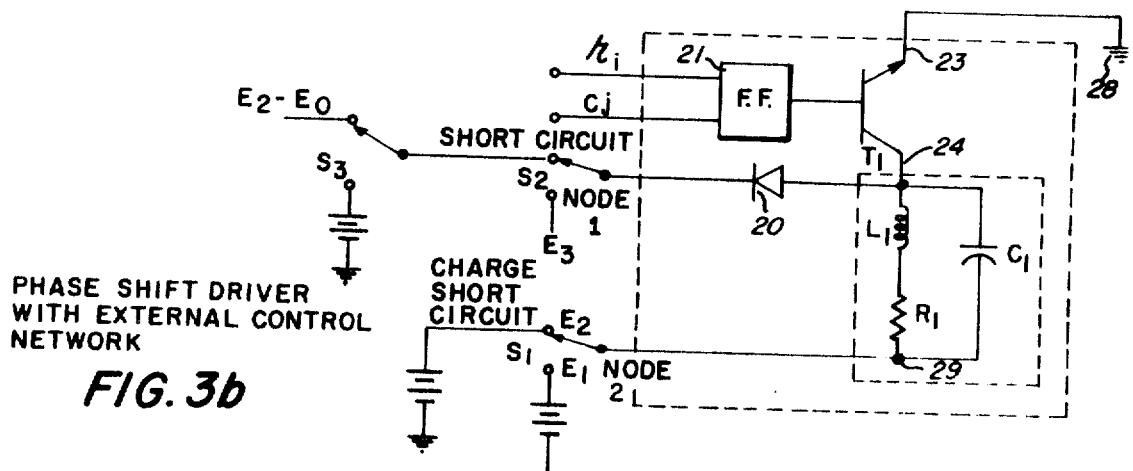
FIG. 3B shows the phase shift driver exhibiting the means for maintaining control of the current source.

In FIG. 3b a modified version of the circuit shown in FIG. 3a is set forth. There are three modes of operation contemplated. The first is a charge mode to establish a commanded current. Second, there is a steady state mode to keep the current constant. A third or dump mode is used to reset the coil current to zero. It should be noted that a capacitor $C_1$ is placed across inductance $L_1$. The inherent coil resistance is symbolically shown as a series resistance $R_1$.

During the first or charge mode, a voltage $E_1$ is applied at nodes 1 and 2. This voltage determines the time required to achieve the final current. In the steady state mode, nodes 1 and 2 are connected to voltage source $E_2$. The value of $E_2$ is such that ($E_2/R_1$) is the current required to produce maximum phase shift. Driving the transistor periodically into saturation with a duty cycle "$d$" will produce an average current in inductance $L_1$ of ($E_2d/R_1$). During the dump mode, node 1 is at $E_3$ and node 2 is coupled to $E_2$. $E_3$ is a potential about 10 percent higher than $E_1$. When the transistor is open-circuited, the inductive emf rises to $E_3-E_2$. The coil current begins to fall at the rate of ($E_3-E_2/L_1$). It will continue at this rate until the coil is discharged providing the coil is not coupled to a "shorted" turn.

Figure 4A:
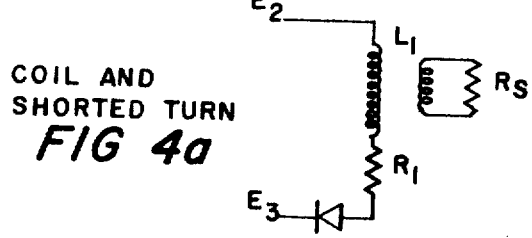
FIG. 4A is a simplified circuit diagram of the phase shifter coil with a shorted turn.
Figure 4B:
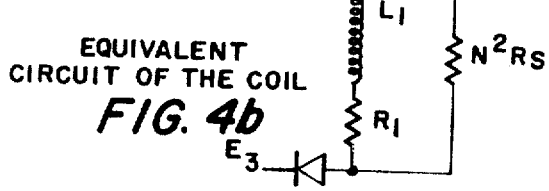
FIG. 4B is an equivalent circuit of the circuit shown in FIG. 4A.
Figure 4C:
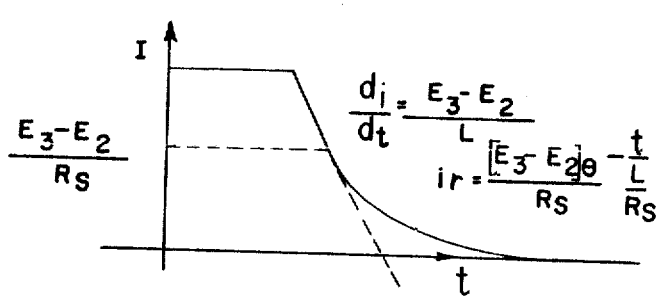
FIG. 4C exhibits the current versus time coil discharge with shorted turn characteristic.

The effect of a shorted turn on the discharge of inductance L of $n$ turns is shown in FIGS. 4a through 4c. It will be seen that the diode 20 disconnects the inductance $L_1$ from the voltage sources whenever the current is below the level ($E_3-E_2/R_s$) where $R_s$ is the transformed shorted turn resistance. Below this current value the current decay is determined by ($L_1/R_s$).

In summary, a beam-switching apparatus in combination with a phased array antenna has been shown in which phase shift angle magnitude signals have been used to pulse width modulate reference signals having a predetermined frequency. A modulo $2\pi$ angle indication necessary for efficient beam-switching operation has been instrumented in an embodiment using a ferrite phase shifter driver by a current source connectable to the phase shifter in response to and for the duration of the width of an applied pulse. This is of particular use in a matrix antenna array in which the amount of phase shift is determined by summing information from row and column conductors and driving the phase shifter between 0° to 360°. This also occurs when the sum exceeds 360° by subtracting modulo $2\pi$ from the sum.

We claim:

1. A circuit for having the control coil of a ferrite phase shifter, the control coil being formed of N turns where N is the number of turns in the coil winding, the control coil having inductance $L_1$, coil resistance $R_1$, and interwinding capacitance $C_1$, the circuit comprising:
   a. a flip-flop circuit having an output port, a SET input port a RESET input port, and responsive to SET and RESET trigger pulses such that a first voltage level is produced at the output port in response to the SET signal and a second voltage level is produced at the output port in response to the RESET signal;
   b. a first and second source of electric power, each source of electric power being connecting to a common ground, the first source of electric power being adapted to provide selectively a voltage of value $V_2$ and a voltage of value $V_3$, $V_2$ being less then $V_3$, the second phase of electric power being adapted to provide, selectively, a voltage of value $V_1$, a voltage of valve $V_3$ and a voltage of value $V_4$, $V_1$ being less than $V_2$ and $V_4$ being greater than $V_3$ such that $V_2+V_{3d}=V_4$;
   c. a diode connecting between one terminal of the control coil and the second source of electric power, a second terminal of the control coil connecting with the first source of electric power;
   d. a transistor coupling from the junction of the diode and a control coil to the common ground whereby a state of conduction within the diode is terminated whenever the transistor is driven into a state of conduction; the transistor connecting with the flip-flop output whereby the flip-flop drives the transistor into a state of conduction when the first voltage level is present at the flip-flop output, and drives the transistor into a state of nonconduction when the second voltage level is present at the flip-flop output;
   e. a row conductor and a column conductor connecting respectively to the SET input port and the RESET input port for transmitting to the flip-flop respectively a SET trigger pulse and a RESET trigger pulse, the SET and the RESET trigger pulses occurring periodically, the duty cycle of the transistor being equal to the ratio of the duration of the interval of conduction to the period of the SET trigger pulses.

2. The circuit of claim 1 in which the control coil is wound around a cylindrical waveguide section, the cylindrical waveguide section appearing as a shorted turn having a resistance $R_s$ and inductively coupling with the control coil to present an apparent resistance of value $N^2R_s$ in parallel with such coil, $N^2R_s$ being substantially larger than $R_1$ so that the time constant of the control coil is substantially $L_1/R_1$.

3. The circuit of claim 2 in which the first source of electric power is supplying a voltage of value $V_2$ and the second source of electric power is supplying a voltage of value $V_1$ so that current flows through the control coil via a path including, alternately, the transistor and the diode, the current through such coil thereby building up to a substantially steady state value having a magnitude proportional to the duty cycle of the transistor.

4. The circuit of claim 2 in which the first source of electric power is supplying a voltage of value $V_3$ and the second source of electric power is also supplying a voltage of value $V_3$ so that current flows through the control coil via a path including, alternately, the transistor and the diode, the current thereby increasing at an average rate proportional to the duty cycle of the transistor.

5. The circuit of claim 2 in which the first source of electric power is supplying a voltage of value $V_3$ and the second source of electric power is supplying a voltage of value $V_4$ so that current flows through the control coil via a path including, alternately, the transistor and the diode, the current through such coil thereby flowing against a voltage of value $V_4 - V_3 = V_3$ and thereby decreasing at a rate related to the duty cycle of the transistor.

6. A circuit for driving current through the control coil of a phase shifter, such circuit being responsive to a periodic train of paired pulses in which the time spacing between the pulses in each pair of pulses designates the magnitude of electric current to be applied to the control coil, the time constant of the control coil being of substantially longer duration than the period of the paired pulses, the circuit comprising:
  a. flip-flop means responsive to the periodic train of paired pulses such that one pulse in each pair of pulses sets the flip-flop thereby initiating at the flip-flop output a switch control signal, the second pulse in each pair of pulses resetting the flip-flop thereby terminating at the flip-flop output of the switch control signal;
  b. a first source of electric power, a second source of electric power, and a diode, the diode connecting between the second source of electric power and one terminal of the control coil, a second terminal of the control coil connecting with the first source of electric power;
  c. grounding means connecting the first and the second sources of electric power;
  d. switching means responsive to the switch control signal, the switching means connecting from the junction of the diode and the control coil to the grounding means whereby the switching means provides a conducting path from the diode to the grounding means during the duration of the switch control signal so that the diode is then nonconducting, and breaks such path during the time interval between the switch control signals so that the diode is then conducting.

7. A circuit for driving current through the control coil of a phase shifter, the circuit responsive to a train of paired pulses for providing a magnitude to the current in accordance with the ratio of the time spacing between pulses in each pair of pulses to the time spacing between successive pairs of pulses in the train of paired pulses, the circuit comprising:
  a. first source of electric power, a second source of electric power, and grounding means, the grounding means connecting a common terminal of the first and the second sources of electric power;
  b. switching means, the control coil connecting between the first source of electric power and one terminal of the switching means, a second terminal of the switching means connecting with the second source of electric power, and a third terminal of the switching means connecting with the grounding means whereby the second and the third terminals are, alternately, connected via a conducting path through the switch to the control coil;
  c. flip-flop means connecting with and driving the switching means, the flip-flop means being responsive to the train of paired pulses such that in response to a first pulse in each pair of pulses a conducting path is provided between the control coil and the grounding means, and in response to the second pulse in each pair of pulses a conducting path is provided between the control coil and the second source of electric power.

8. A driver in combination with a ferrite phase shifter comprising:
  a first voltage source;
  an inductance forming an input portion of the ferrite phase shifter;
  means responsive to an applied pulse train for forming a first conducting path including the inductance and the first voltage source for the duration of each pulse;
  a second voltage source; and
  means for forming a second current path including the inductance and the second voltage source during the interpulse interval whereby a current integrating characteristic becomes synthesized.

9. A current driver in combination with a ferrite phase shifter comprising:
  a first voltage source;
  a coil forming an input portion of the ferrite phase shifter;
  means, including a transistor coupling the coil, and responsive to an applied pulse train for forming a first conducting path including the coil and the first voltage source for the duration of each pulse, said transistor being driven into saturation;
  a second voltage source; and
  means including the transistor for forming a second current path including the coil and the second voltage source during the interpulse interval, the transistor being in an open circuit condition as allowed by the second current path, whereby the level of integrated current in the coil is proportional to the duty cycle modulation of the appended pulse train.

UNITED STATES PATENT OFFICE
CERTIFICATE OF CORRECTION

Patent No. 3,596,145          Dated July 27, 1971

Inventor(s) Edward J. Sheldon, Rosario Mangiapane, Edwin Segarra

It is certified that error appears in the above-identified patent and that said Letters Patent are hereby corrected as shown below:

Column 1, line 67, change "$t_R = (\Phi_R T_0 / 2\pi)$" to -- $t_R = \Phi_R T_0 / 2\pi$ --

Column 1, line 71, change "$t_C = (\Phi_R T_0 / 2\pi)$" to -- $t_C = \Phi_R T_0 / 2\pi$ --

Column 2, line 3, change "$t_R - t_C > 1$, n being any integer and $|\phi_C + \phi_R - 2\pi n| < 2\pi$" to -- $t_R + t_C / T_0 > 1$, n being any integer and $|\Phi_C + \Phi_R - 2\pi n| < 2\pi$. --

Column 2, line 14, change "$(\Phi\ 2\pi)$" to -- $\Phi/2\pi$ --

Column 2, line 64, change "Thus," to -- Likewise, --

Column 2, line 72, change "course" to -- source --

Column 3, line 4, change "$(1/T_0)$" to -- $1/T_0$ --

Column 3, line 12, change "$(\Phi_R I_0 / 2\pi)$." to -- $\Phi_R T_0 / 2\pi$. --

Column 3, line 49, change "AFter" to -- After --

Column 4, line 20, Claim 1, change "having" to -- driving --

Column 4, line 26, Claim 1, section a., insert -- and -- before "a RESET"

Column 4, line 31, Claim 1, section b., insert -- a -- before "second"

UNITED STATES PATENT OFFICE
CERTIFICATE OF CORRECTION

Patent No. 3,596,145            Dated July 27, 1971

Inventor(s) Edward J. Sheldon, Rosario Mangiapane, Edwin Segarra

It is certified that error appears in the above-identified patent and that said Letters Patent are hereby corrected as shown below:

Column 4, line 32, Claim 1, section b., change "connecting" to -- connected --

Column 4, line 35, Claim 1, section b., change "phase" to -- source --

Column 4, line 37, Claim 1, section b., change "valve" to -- value --

Column 4, line 39, Claim 1, section b., change "$V_2 + V_{3a} = V_4$;" to -- $V_2 + V_3 = V_4$; --

Column 4, line 47, Claim 1, section d., change ";" to -- , --

Column 5, line 20, Claim 6, omit "the" (second occurrence)

Column 5, line 30, Claim 6, section a., omit "of"

Column 6, line 2, Claim 7, section a., insert -- a -- before "first"

Column 6, line 50, Claim 9, change "appended" to -- applied --

Signed and sealed this 13th day of June 1972.

(SEAL)
Attest:

EDWARD M. FLETCHER, JR.
Attesting Officer

ROBERT GOTTSCHALK
Commissioner of Patents